(12) United States Patent
Wallis et al.

(10) Patent No.: US 9,055,352 B2
(45) Date of Patent: Jun. 9, 2015

(54) NON-LINEAR INTERACTIVE VIDEO NAVIGATION

(75) Inventors: Emily Claire Louise Wallis, Hitchin (GB); James Wilson Taylor, London (GB); William Ellis, London (GB); Rhodri William Talfan Davies, Bristol (GB)

(73) Assignee: Video Networks IP Holdings Limited, Hamilton (BM)

( * ) Notice: Subject to any disclaimer, the term of this patent is extended or adjusted under 35 U.S.C. 154(b) by 1343 days.

(21) Appl. No.: 10/972,193

(22) Filed: Oct. 22, 2004

(65) Prior Publication Data

US 2005/0188408 A1 Aug. 25, 2005

Related U.S. Application Data

(60) Provisional application No. 60/513,416, filed on Oct. 22, 2003.

(51) Int. Cl.
*G06F 3/00* (2006.01)
*G06F 13/00* (2006.01)
(Continued)

(52) U.S. Cl.
CPC ........... *H04N 21/816* (2013.01); *H04N 5/4401* (2013.01); *H04N 5/44543* (2013.01);
(Continued)

(58) Field of Classification Search
CPC ....... H04N 21/20; H04N 21/21; H04N 21/25; H04N 21/25891; H04N 21/258
USPC .......................................... 725/88, 46, 51, 52
See application file for complete search history.

(56) References Cited

U.S. PATENT DOCUMENTS

| 5,828,370 A | 10/1998 | Moeller et al. |
| 6,229,524 B1 | 5/2001 | Chernock et al. |

(Continued)

FOREIGN PATENT DOCUMENTS

| EP | 1 175 095 A2 | 1/2002 |
| EP | 1 187 481 A2 | 3/2002 |

(Continued)

OTHER PUBLICATIONS

"PCT International Search Report of the International Searching Authority", mailed Feb. 14, 2005, for PCT/GB2004/004491, 4pgs.

(Continued)

*Primary Examiner* — Nasser Goodarzi
*Assistant Examiner* — Kyu Chae
(74) *Attorney, Agent, or Firm* — Buckley, Maschoff & Talwalkar LLC

(57) ABSTRACT

A system and method for delivering interactive video and audio content items, e.g., movie clips, music videos, adverts, to a user playback device, such as a television (TV) set. In a preferred embodiment, the content items are delivered within a video on demand (VoD) environment. Each content item has associated attributes that detail the navigational properties for that content item. The content items are delivered as entries in a content sequence. Nonlinear navigation of the video content sequence is facilitated by querying the associated attributes for the current content item and enabling navigational actions (e.g. FF/REW/PAUSE/SKIP/Jump to target) for that content item accordingly. The content items thus permit varying degrees of user interaction. The user interaction is not bound by predetermined navigational rules, since the user is free to experience the sequenced VoD content items in any order.

8 Claims, 5 Drawing Sheets

(51) Int. Cl.

| | |
|---|---|
| H04N 5/445 | (2011.01) |
| H04N 7/173 | (2011.01) |
| H04N 21/81 | (2011.01) |
| H04N 5/44 | (2011.01) |
| H04N 21/2343 | (2011.01) |
| H04N 21/2387 | (2011.01) |
| H04N 21/262 | (2011.01) |
| H04N 21/432 | (2011.01) |
| H04N 21/45 | (2011.01) |
| H04N 21/472 | (2011.01) |
| H04N 21/482 | (2011.01) |
| H04N 21/6543 | (2011.01) |
| H04N 21/6587 | (2011.01) |
| H04N 21/84 | (2011.01) |
| H04N 21/8543 | (2011.01) |
| H04N 21/858 | (2011.01) |

(52) U.S. Cl.
CPC ... *H04N7/17336* (2013.01); *H04N 21/234381* (2013.01); *H04N 21/2387* (2013.01); *H04N 21/26258* (2013.01); *H04N 21/4325* (2013.01); *H04N 21/4532* (2013.01); *H04N 21/47202* (2013.01); *H04N 21/482* (2013.01); *H04N 21/6543* (2013.01); *H04N 21/6587* (2013.01); *H04N 21/8113* (2013.01); *H04N 21/812* (2013.01); *H04N 21/84* (2013.01); *H04N 21/8543* (2013.01); *H04N 21/858* (2013.01)

(56) References Cited

U.S. PATENT DOCUMENTS

| | | | |
|---|---|---|---|
| 6,631,523 B1 * | 10/2003 | Matthews et al. | 725/53 |
| 6,718,551 B1 * | 4/2004 | Swix et al. | 725/32 |
| 2002/0159594 A1 | 10/2002 | Kori | |
| 2003/0009371 A1 * | 1/2003 | Gauba et al. | 705/10 |
| 2003/0041328 A1 * | 2/2003 | Khoo et al. | 725/47 |
| 2003/0084449 A1 | 5/2003 | Chane et al. | |
| 2003/0093790 A1 * | 5/2003 | Logan et al. | 725/38 |
| 2003/0095790 A1 | 5/2003 | Joshi | |
| 2003/0149975 A1 * | 8/2003 | Eldering et al. | 725/34 |
| 2003/0192054 A1 | 10/2003 | Birks et al. | |
| 2003/0226151 A1 * | 12/2003 | Hamada et al. | 725/132 |
| 2004/0073924 A1 * | 4/2004 | Pendakur | 725/46 |
| 2004/0226042 A1 * | 11/2004 | Ellis | 725/43 |
| 2005/0010953 A1 * | 1/2005 | Carney et al. | 725/61 |
| 2005/0283800 A1 * | 12/2005 | Ellis et al. | 725/40 |
| 2006/0059517 A1 * | 3/2006 | Thelen et al. | 725/46 |
| 2008/0282285 A1 * | 11/2008 | Thomas et al. | 725/32 |

FOREIGN PATENT DOCUMENTS

| | | |
|---|---|---|
| EP | 1 225 763 A1 | 7/2002 |
| EP | 1 345 440 A2 | 9/2003 |
| WO | 03 096173 A1 | 11/2003 |

OTHER PUBLICATIONS

Patents Act 1997: "Search Report under Section 17", dated Feb. 22, 2005, for GB0423590.9, 1pg.

* cited by examiner

| ATTRIBUTES | | | | | |
|---|---|---|---|---|---|
| SKIPPABLE | N | Y | N | Y | Y |
| VCR-LIKE | N | Y | N | Y | N |
| TARGET | N | CONTENT F | N | CONTENT G | CONT. SEQ. 2 |
| SAVE TO FAVOURITES | N | Y | N | Y | N |

102   104   106   108   110   100

```xml
<Screen>
    <Name>Home</Name>
    <Component>
        <GeneralNavigation>
            <ConstructStyle>_TextList_</ConstructStyle>
            <ConstructType>2</ConstructType>
            <Title>FilmFirst</Title>
            <BackDrop>filmfir2-01generic</BackDrop>
            <NumOfItems>5</NumOfItems>
            <OptionText>
                <Item>Top 10 Films</Item>
                <Item>New Releases</Item>
                <Item>Recommended</Item>
                <Item>Last Chance</Item>
                <Item>All Films A-Z</Item>
            </OptionText>
            <OptionNextScreen>
                <Item>TopTenFilms</Item>
                <Item>FilmNew</Item>
                <Item>FilmRec</Item>
                <Item>FilmLast</Item>
                <Item>FilmAZ</Item>
            </OptionNextScreen>
        </GeneralNavigation>
    </Component>
</Screen>

<Screen>
    <Name>TopTenFilms</Name>
    <Component>
        <GeneralNavigation>
            <ConstructStyle>_TextList_</ConstructStyle>
            <ConstructType>2</ConstructType>
            <Title>Top 10 Films</Title>
            <PromoListCode>FFTPROMO</PromoListCode>
            <BackDrop>filmfir2-01generic</BackDrop>
            <NumOfItems>10</NumOfItems>
            <ListType>_Category_</ListType>
            <ParentCategoryCode>FFTTF</ParentCategoryCode>
            <AllOptionsNextScreen>TopTenEp</AllOptionsNextScreen>
        </GeneralNavigation>
    </Component>
</Screen>
```

Fig 3

NON-LINEAR INTERACTIVE VIDEO NAVIGATION

CROSS-REFERENCE TO RELATED APPLICATION

This application is based on, and claims benefit of and priority to, U.S. patent application Ser. No. 60/513,416 filed Oct. 22, 2003, the contents of which are incorporated herein by reference in their entirety for all purposes.

FIELD

Embodiments relate to a system and method for delivering interactive video and audio content items to a user playback device, such as a television (TV) set. In particular, embodiments relate to the delivery of video on demand (VoD) content items, where the content items are provided within a video on demand environment and permit user interaction with content items.

BACKGROUND

In broadcast and multicast digital TV, each TV channel is constructed of one or more programme streams (PS). Service information (for example, information relating to the content, scheduled time, or channel) is broadcast along with the TV channels themselves. Each PS is itself composed of individual programmes. A viewer experiences the broadcast programmes in a set order and at a predetermined time. The viewer is generally given access to an electronic programme guide (EPG), which is generated from the service information and which shows the programmes and/or channels and their schedule airtime. Through the selection of a channel within the EPG, the user can control the content displayed on a TV set.

Video on Demand (VoD) content is also structured as services for delivery in programme streams, which are experienced by viewers as channels. Each VoD programme stream initially presents a list of viewable content, i.e. a menu. In many cases, the menu is displayed within an EPG. Content items are selected for viewing from the menu, through user interaction with the EPG, for example. VoD content items are then generally downloaded as individual items from the list of items.

It is known to obtain broadcast programme streams, together with service information indicating constituent programmes, and to extract the respective programmes as content items for storage and later playback. The extracted content items can then be presented in the same way as any other VoD content item, i.e. as items on a list. Again, user selection of content items for viewing is facilitated through user interaction with an EPG.

It should be noted that the term "content item", in the context of video output, includes: videos (e.g. movies, music videos, time-shifted TV programmes); promos; and stings (also referred to as interstitials). In broadcast television, advertisements and other interstitial content are often inserted between sections of main programmes by the broadcaster.

To facilitate user selection of programme/channel for viewing, conventional digital video delivery systems provide each viewer with a set top box (STB) device and an associated remote controller. The STB generates an EPG for displaying user options and programme schedules on a user playback device, such as a TV set. The remote controller is configured to adapt with the STB and has control buttons, so that a user may press a button on the remote control in order to control an action effected by the STB, the EPG presented on the TV set facilitating this selection and showing which action has been requested. Each customer or viewer interacts with a STB to control the viewing and receipt of video and other data. In some instances, the set top box functionality is integrated in the television set and control of the STB functionality is effected through the normal TV remote controller.

The interaction between user and STB is linear in the sense that the viewing of the content items on any given broadcast or VoD channel consists of selecting a content item then letting the content item stream onto the user display with no further input from the user.

SUMMARY

According to one aspect of the present invention there is provided a method for delivering video on demand (VoD) content items, the method comprising: storing a plurality of content items in a content store, each content item having associated attributes, wherein at least one of the associated attributes of each content item characterises which navigation actions are available for the content item; storing the associated attributes for each content item in an attribute store; storing a content sequence list, which determines the order in which content items are to be delivered from the content store, and serving each content item in the content sequence list to a remote user device in accordance with the respective associated attributes of each sequenced content item, thereby enabling navigation within VoD content items in the content sequence in accordance with navigation attributes.

As a result of some embodiments of the present invention, a data structure, referred to as a content sequence, comprising a plurality of content items is generated. The remote user playback device retrieves content items that constitute the content sequence with reference to a database where the content sequence list is stored. The content sequence data structure allows user access to the navigational properties of the constituent content items, thereby permitting non-linear interaction with the content items. Thus the user experiences a more engaging interaction with the content items. Where attributes are set to allow it, the user has navigational control over streamed VoD content items.

In some embodiments, the content sequence list is a manually prepared list. The selection and ordering of the content items in the resulting content sequence can thereby be defined by a human operator, preferably situated at a VoD service provider.

In some embodiments, the associated attribute is a "can skip" flag and the navigation action is a skip action, the action being available if the "can skip" flag indicates that the content item is skippable.

With this particular attribute set for a given content item, the user is permitted to skip one or more content items in the content sequence.

In some embodiments, at least one of the navigation attributes is a target property, and that the navigation action is a jump action, in which the playback point jumps from the current content item to a target in accordance with the target property. Consequently, the content items in the content sequence can be linked to a variety of types of content. Provided jumping is itself permitted, the user can be informed of the availability of content and given a straightforward way of accessing that content (the link to the target).

The target may be a further content item, the target property being a content identifier corresponding to the further content item. In one implementation, the content item is a music video promotional content item and the further content item is a corresponding music video content item.

The method enables the generation of an interactive music video channel from a sequence of music video promos with the facility for viewing the full-length video content item in addition to the potential for skipping unwanted music videos or replaying wanted music videos at the user's whim.

Alternatively, the target may be a further content sequence, the target property in this case being a sequence identifier corresponding to the further content sequence.

In accordance with a further aspect of the invention, there is provided a method for facilitating navigation from a current streaming video content item to another streaming video content item, each of the video content items having associated attributes, the method comprising: displaying an interactive navigation menu screen, the screen including at least one user selectable portion and a user controllable cursor, the or each selectable portion representing available navigation actions associated with the current video content item; receiving a user selection signal corresponding to the selection of one of the selectable portions of the screen; and automatically initiating the performance of the selected action in accordance with the attributes of the current video content item, wherein at least one of the attributes of the current video content item characterise which navigation action are available for selection.

The menu provides an interactive graphical user interface with user selectable portions, whereby the attributes of the current content item govern the presentation of the selectable portions on the screen. Providing such a menu, leads to a user interaction that is straightforward and intuitive. Rather than requiring each navigation action to be effected in the code (the build file) for the menu itself, this method allows the interface to reflect the available attributes of the content item being streamed to the user.

In accordance with another aspect of the invention, there is provided a system for delivering video on demand (VoD) content items, the system comprising: a content store for storing a plurality of content items, each content item having associated attributes, wherein at least one of the associated attributes of each content item characterises which navigation actions are available for the content item; an attribute store for storing the associated attributes for each content item; a list store for storing a content sequence list, which determines the order in which content items are obtained from the content store, and a content server for serving each content item in the content sequence list to a remote user device in accordance with the respective associated attributes of each sequenced content item, thereby enabling navigation within VoD content items in the content sequence in accordance with navigation attributes.

In accordance with yet another aspect of the invention, there is provided a system for facilitating navigation from a current streaming video content item to another streaming video content item, each of the video content items having associated attributes, the system comprising: means for displaying an interactive navigation menu screen, the screen including at least one user selectable portion and a user controllable cursor, the or each selectable portion representing available navigation actions associated with the current video content item; means for receiving a user selection signal corresponding to the selection of one of the selectable portions of the screen; and means for automatically initiating the performance of the selected action in accordance with the attributes of the current video content item, wherein at least one of the attributes of the current video content item characterise which navigation action are available for selection.

In some embodiments, the action is to alter the displayed video stream to an associated video content item on the display.

BRIEF DESCRIPTION OF THE DRAWINGS

Examples of some embodiments of the present invention will now be described in detail with reference to the accompanying drawings, in which:

FIG. 3 shows an example of a service build file for providing two linked screen components;

DETAILED DESCRIPTION

Figure 1:
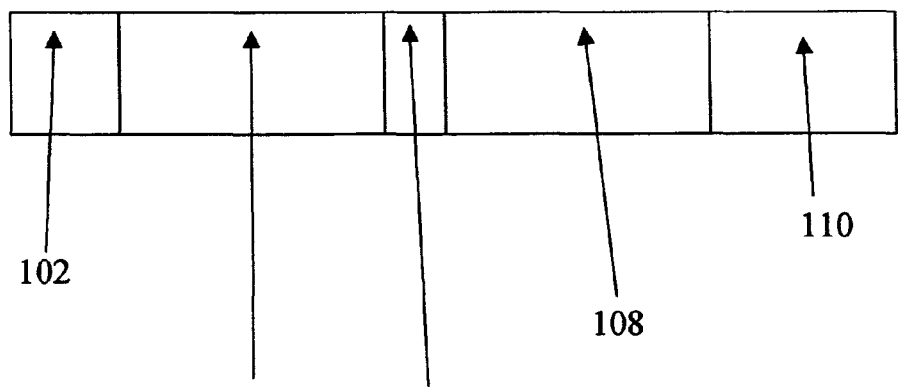
FIG. 1 shows a content sequence data structure into which content items are assembled in accordance with an aspect of the invention.

FIG. 1 shows an illustrative content sequence data structure 100 into which a plurality of content items 102, 104, 106, 108, 110 are assembled.

The content items each have different associated attributes, a few of which are displayed in the table in FIG. 1. Sting A 102 is an interstitial content item. Sting A's attributes indicate that it is not skippable (pressing the "Skip" button on the remote is not enabled while this content item is streamed onto the user display). The absence of a "Target" value (i.e. an identifier for another content item) in the attributes for Sting A means that the sting does not link to another content item.

Content item B 104 is an item of video content (a music video, say). The attributes associated with this content item reflect the desired navigation properties: the item is thus skippable, VCR-like, can be saved to favourites and has a target. The user can thus skip, fast forward, rewind and/or pause this piece of content. In addition, the user may save the content item to a favourites list in the current user profile. Having a target value, here identifying the target as "Content F", means that the user is able to link to a completely different content item by reference to a content item identifier by electing to link to the target.

Promo C 106 is an advertisement video. As might be expected, the attributes for this advertisement prohibit skipping of the content item (and likewise VCR-like functionality) while the item is played back.

Content item D 108 is another item of video content (another music video, say). As for the other video content item, the associated attributes reflect the desired navigation properties. The target value, here, is "Content G".

Promo E 110 promotes an link to a new content sequence "Cont. Seq. 2". While this promo is skippable, VCR-like behaviour and saving to favourites would be inappropriate and have been disabled through the associated attributes.

Figure 2:
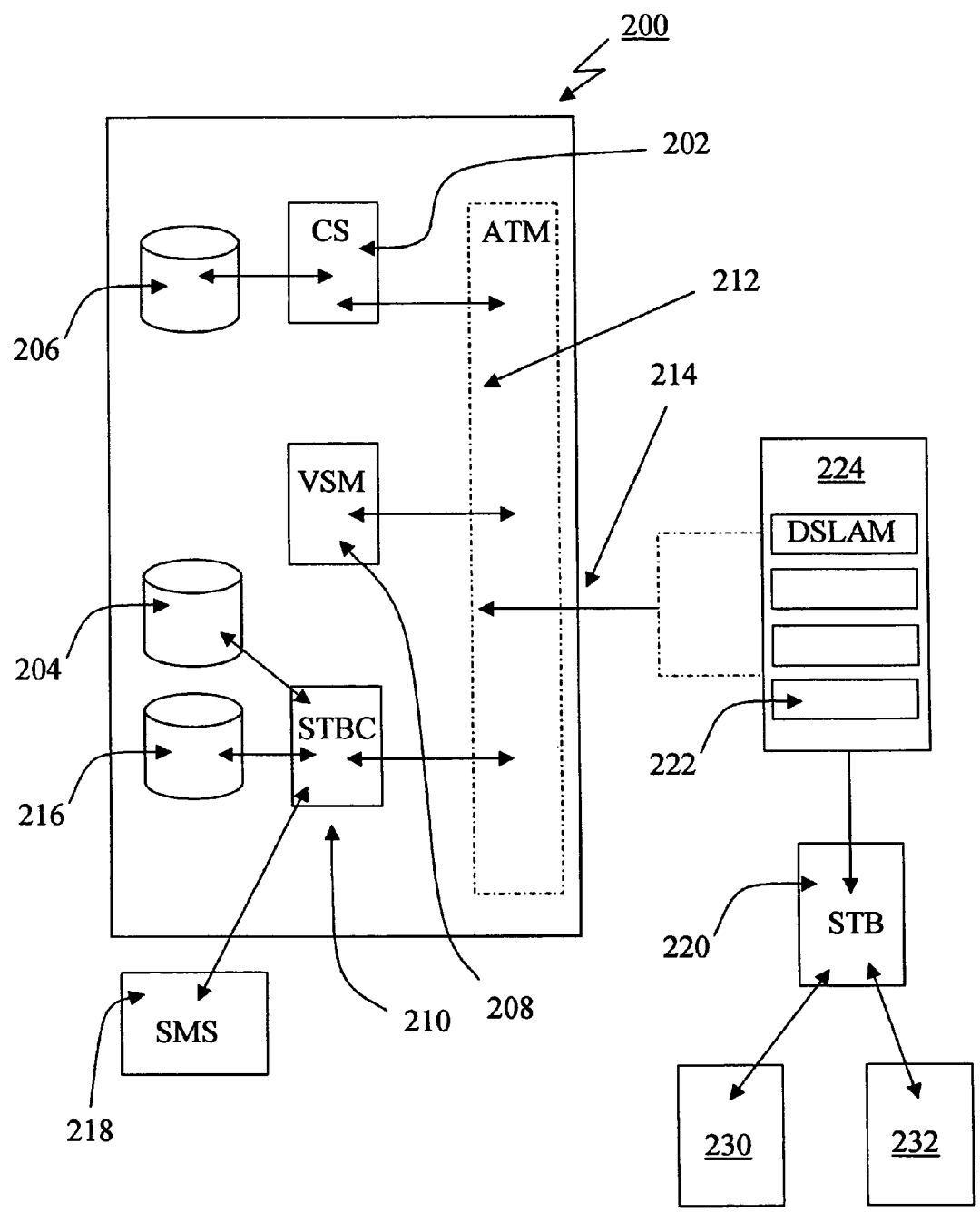
FIG. 2 shows a schematic diagram of a video content delivery system suitable for delivering content sequences.

Delivery of VoD content sequences, such as that illustrated in FIG. 1, requires a delivery system that permits two-way exchange of data between each STB and a content source. One suitable delivery system has an architecture as illustrated in FIG. 2. In this figure, the STBs 220 communicate with a remote video server 200: each STB 220 being connected by means of a wired connection to a line card 222 (a DSLAM) in a local exchange 224, and from the exchange along a "backhaul" connection 214 to the video server 200.

The illustrated video server 200 has a facility for capturing a plurality of broadcast channels, and controlling the re-broadcasting of the captured channels. The facility is referred to as the "head end". Along with the video output for these channels, the broadcast head-end intercepts and records channel metadata, which includes programme information.

The video server 200 includes: a content server (CS) 202 for serving VoD content; a service database 204; a content store 206; a video server manager (VSM) 208; a set-top box session manager (STBC) 210; and a user preference engine 212. In certain implementations, the VoD content includes recorded, already-broadcast programmes. The delivery of VoD content is under the control of the VSM 208.

The content store 206 is a high capacity storage means, such as an array of magnetic storage disks. Each content item stored in the content store has associated attributes, metadata that indicates properties of the content item.

The service database 204, in operation, stores service data, which define the services offered to users. These services cover the provision of VoD menus (content lists from which further menus and content items can be accessed) and the data structures define how and whether a given content item is delivered to a particular STB. A service management system (SMS) 218 is provided to govern the services offered to users centrally by updating the data structures stored in the service database 204.

The STBC 210 accesses the service database 204 to retrieve information regarding services related to the current session for each active STB.

As well as storing service data structures, the service database 204 also stores attributes associated with respective content items stored in the content store 206.

In this delivery system architecture, it is preferred to provide a user-accessible graphical user interface (GUI). To generate a suitable GUI for the available VoD content, VoD services are specified within data structures called "service build files". A service build file specifies all of the possible navigation screens that can appear on the viewer's TV set 230 when viewing a corresponding (VoD) TV service. Each screen specifies a particular layout and associated functionality. Examples include: "static menu list", "video menu list", "3×3 video wall", "charge customer for video rental", "play movie", and "context help".

Video menus are menu screens that present video content items in a list for selection with a video content item playing back in background.

In general, each of the screens within the service is named, and linked to other screens using navigational rules. Navigational rules based on, for example, content lists, are determined by the content identifiers specified in the service database.

The service build file (and associated graphic bitmaps and overlays) may conveniently be supplied to, and stored on, the STB 220 when it boots. The STB runtime software, for instance a Java virtual machine and drivers to control the hardware, then configures a set of service components using the service build file as input. The result is a set of (personalised) screens that the user can navigate between and select content for viewing.

Service components are executable modules that perform specific processing tasks when called. The service components are developed in high level programming languages, such as Java. They are highly configurable and flexible functional units, which can interoperate in many ways, according to the screens defined in the service build file.

"Screens" defined in this way include full screen bitmap displays; displays that include scaled down versions of video content; and displays with full screen video content overlaid with a graphical interface (e.g. a bitmap). Different screen types are presented in dependence upon: user preference; the presence of flags in the metadata associated with the content item currently being streamed to the screen; and the configuration settings recorded in the service build file. For instance, content list screens are usually associated with a background video that plays while that screen is active.

Screen data, for example in the form of navigation choices or content lists, can either be statically defined in the service build file, or dynamically retrieved from a remote service database. In the case of dynamic retrieval, each screen is defined with an associated parameter containing the name of the target (a further list, screen or navigation target) to be retrieved. This name is used when the service database is queried to retrieve the appropriate content list.

In one implementation, service build files are files authored by non-programmers, known as "service authors", using dedicated XML compatible tools. This is possible since less expertise is required to join components together than to develop low level code to implement the required functionality. An example of the kind of parameter/value format used is shown in FIG. 3.

The content database can be externally manipulated by an operator to change the navigation structure or content list that appears for a given transaction. Selecting an item of content on the screen provides the ability to play that item, and optionally provide further information about that content, e.g. actors/singers, chart position, year made etc.

Within the delivery system illustrated in FIG. 2, the content sequence list stored in a list store in accordance with the invention facilitates the display of a succession of video content items, each of which is "actionable" in a number of ways. A content sequence list may be thought of as a data structure similar to a service build file. Just like service build files, content sequence lists are stored in the service database and the resulting displayed content sequence is experienced by a viewer as a VoD service. Indeed, service build files may conveniently provide screens within which content items in a content sequence are displayed.

Consider a scenario where the content sequence list results in a sequence of promotional video content items, and where at least one of the available navigation actions is a linkage between each promotional video content item and a respective, corresponding destination content item (target), related to the associated promotion.

For a screen within a service build file to make use of such a promo video content sequence list, a variable (referred to as the "PROMOLIST variable") is assigned within the service build file described in FIG. 3. The PROMOLIST variable contains the name (identifier) of the content sequence list. The name is then used as a parameter to a query (from the STB to the service database) that returns the next interactive navigation video content item from the named content sequence. The example of PROMOLIST shown in the "Top Ten Films" screen illustrated in FIG. 3 is "FFTPROMO".

The content sequence lists referred to in the PROMOLIST variable are maintained in a content sequence table in the service database 204. Each entry in this table contains lists of interactive navigation video sequences referred to by content identifiers.

When the screen is entered, the STB queries the service database with the value of PROMOLIST variable. A content identifier for the next content item in the content sequence list is returned, and the STB then queries the service database for attributes (metadata) associated with that content item. At the same time, the STB requests (from the content store via the VSM) that the content item is played, resulting in the interactive navigation video content item being displayed on the user's TV set 230.

The attributes associated with each content item (metadata) are stored in the service database. They include various property indicators and flags, for example:

Content id—the unique reference to the content item;

Popup text—information about the target content item referred to in the metadata for the playing content item;

Time codes—to allow long video sequences containing multiple promotions to be cut down into manageable chunks, it is possible to specify "from" and "to" time codes;

Target—the specified destination of the link;

Video controllable—whether the ff/rew/pause keys active;

Can skip—whether the user can immediately move to the next video in the sequence;

Can save to favourites—whether a button press can cause an item to be added to the user's favourites list, the actual content item being, under user control, either: the source item current being played; or the destination item referred to in the "Target";

Returnable—if this is set, then when skipping backwards through interactive videos, the customer can view the interactive video again; this can be used to prevent videos such as non-interactive interstitial videos (e.g. "stings" and other branding) appearing; or Can jump—whether the customer is allowed to action the link to Target.

When the interactive navigation video content item is playing, the popup text is displayed on screen. If the can jump flag is set, then the user has the option of pressing a button to follow the link to the target. The popup text can either give further information about the Target, or try to tempt the user into following the link. Preferably, the popup text is only displayed on the screen for the first few seconds after each content item starts playing, thereafter it disappears. A specific key on the remote controller device can be arranged to make the popup text reappear upon user actuation.

If the can jump flag is set, then the STB displays a visual indicator on screen to inform the user that the background video content item is interactive.

The Target attribute can be one of several types:

a specific item of content (e.g. Friends Season 3, Episode 2, "The one where it's funny for a change");

a series of content (e.g. Friends Season 3);

a TV channel;

a category of content (e.g. Comedy Films);

a credit e.g. actor/director/artist etc (e.g. videos by Britney Spears);

another VoD screen or service (e.g. film on demand store, music station);

a product (e.g. a fountain pen); or quizzes, competitions and questionnaires

When the link is actioned by a user button press, the STB queries the service database for the type of the target, and arranges for control to be passed to that point. The STB records the fact that this interactive navigation video content item has been viewed and actioned. This is helpful in avoiding unnecessary repeated display of a content item and for management information purposes.

By providing a recently visited content items list, it is possible to allow the user to return to the content sequence that they navigated away from, using the "stepback" key on the remote control. In this case, the user is returned to the next video content item in the sequence. Whether this action is enabled is dictated by the value of the "returnable" flag.

The user has varying degrees of control over the interactive navigation video content item. By setting the video controllable metadata flag in the associated attributes for a given content item, it is possible to indicate that VCR style controls are allowed, permitting the user to pause, fast forward or rewind the interactive navigation video at the touch of the appropriate remote control buttons.

Another metadata item of an interactive navigation video is the can skip flag. If this flag is set, then the user can press a button (e.g. the stop button) to move to the next video in sequence, using the mechanism described above. Additionally, using the recently visited content items list, a "skip to previous" function is available if the user wishes to review the previous interactive video again. As might be expected, the configuration of video content items, promos and interstitials (stings) may differ: broadly speaking, videos are skippable and (usually) have no linkage to another area of the service, whereas the interstitial videos are generally not skippable and promos may well be associated with links to other parts of the service, or other services, that are being promoted.

It is further possible to arrange that key interactive navigation video content items are non-VCR controllable, and non-skippable. These can be used, in effect, as advertisements that cannot be avoided by the viewer. They can still retain the interactive navigation function in order to provide for linking to other targets.

When the current interactive navigation video content item finishes playing, the next item in the content sequence list is retrieved and played, using the mechanism described above. At the end of the content sequence list, the videos are reset and viewing begins again at the first interactive video. The sequence of videos need not be fixed and each reset action may include a random sequencing component to generate a new random content sequence list of video content items.

In one implementation (as illustrated in FIG. 2), the service database 204 can be augmented with a user preference engine 216. This user preference engine tracks user behaviour and builds a profile of each user. This information is used to direct content or advertising more appropriately at the viewer, by generating a list of interactive navigation video content items deemed most appropriate for that viewer.

In a particular embodiment of the invention, the system enables the presentation of a sequence of interactive promotional content items that allow customers to link directly from a streamed promotional feature/content item to the service being promoted.

For example, a customer viewing an VoD entertainment channel is presented with a promotion for a top-rated series (say, The Sopranos). A single button press during the run-time of this promotion will link the viewer directly to a list of episodes for the featured series. Another example might be a VoD music video service where the content sequence is a sequence of music video content item clips with targets attributes that are directed to the 'full length' music video content item.

Figure 4:
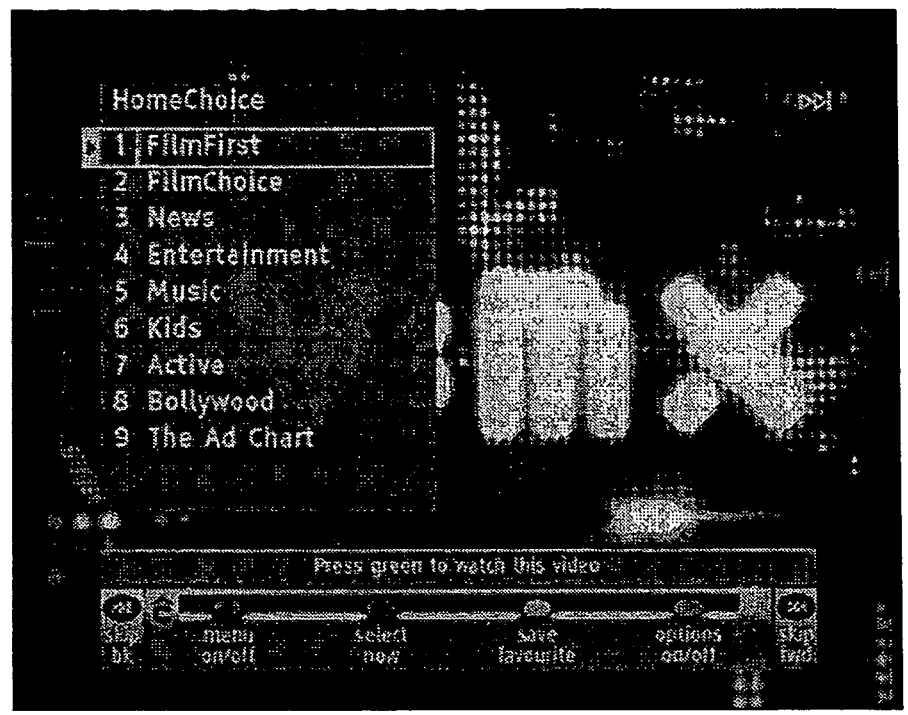
FIG. 4 shows a snapshot of a TV display.

In FIG. 4, a screen, or graphical user interface (GUI), for interactive promotions is displayed. In the illustrated screenshot, a sequence of music video promotional content items is being unicast behind the GUI bitmaps that constitute the navigation interface. Associated with each music video promotional content item is metadata, including a respective promotion target content item (generally the corresponding 'full length' music video). For the duration of the streaming of this promotional content item, selecting the green button on the remote control unit will link the viewer directly to the targeted video content item, subject to automated eligibility checks: pressing the yellow button will register the featured video as a user favourite.

There now follows an overview of the preferred DVD-like functions provided by the interactive facility. As explained above, the service builder/author can choose to create sequenced lists of content items. This will advantageously promote items to the customer while the customer navigates around the service.

A "content item" can belong to any one of a number of different content item types or environments e.g. Content, Trailers, Broadcast Channels etc. Each promotional content item may link to a "navigation target". That is, a viewer can jump to the target to which the current promotional content item is linked, e.g. a film trailer can link straight to the beginning of a featured title.

The jump is triggered by the customer, when a nominated key, "the handler", is pressed on the remote control unit.

Figure 5:
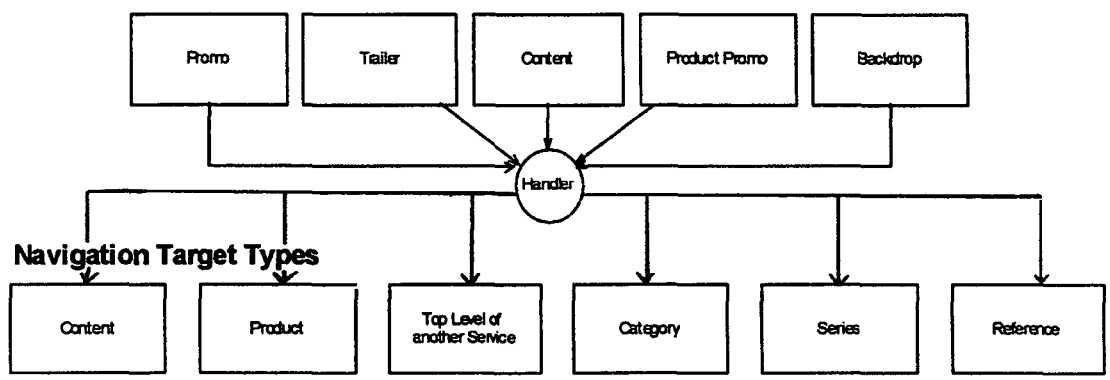
FIG. 5 shows diagrammatically a range of targets to which the TV user may navigate and corresponding promo lists establishing the links in accordance with some embodiments of the invention.

FIG. 5 shows examples of the different types of content items that may be displayed in the sequence of content items and the 'navigational targets' that can be defined.

Each content item may be either unicast or multicast to the user. Where the content item is unicast, the customer may skip to the next promotion in the streamed sequence by pressing the skip key on the remote controller. This immediately halts the current promotion being streamed and starts the next promotion in the configured sequence.

In addition, the navigation facility allows the user to fast forward, rewind and pause any individual promotional content item, thereby emulating the familiar functionality of a DVD player. Using service information gleaned from the content, a playback point within each content stream can be defined (as for example a time offset from beginning of content item). Just as a DVD video can be subdivided into "chapters", skipping can be effected by allowing skipping to predetermined points in a content stream. Conveniently, there is also provided a facility for skipping a predefined time interval (say one minute) within a content stream. Fast forward and Rewind facilities are used frequently enough that it is efficient to provide a separate FF content stream (which played in reverse becomes a REW stream). The user can then continue to view the content as he would if he used a DVD FF/REW facility. These additional streams are either stored with the 'normal speed' content items in the content store (but with different identifiers) or in a separate "trick" content store. They may indeed have their own attributes some of which may differ from those of the equivalent 'normal speed' content item.

An interactive promotion may also enable the user to save the navigational target to a personalized content sequence list of viewing choices (known as a favourites playlist). For example, in FIG. 3, if the user selects a certain key (the yellow key, say), the video currently being promoted will be added to the user's personal playlist. It should be noted that it is the video content item—i.e. the navigational target—not the promotional content item that is stored in the playlist.

This functionality can be applied to an entire series or other grouping of content, not just single items of content.

A special example of a data structure to and from which a user may link is the favourites playlist. This may be a user-editable personal playlist constructed as a result of user "save to favourites" actions. The playlist may be structured as an authored content sequence list in accordance with the invention.

The "Handler" in FIG. 5 is defined by the service author. Defining the service build file tells the system which screen should be used for handling a jump to a given content item.

Thus, the screens presented in the navigation functionality for content items in the music video category could be distinct from the screens presented for movie content items.

When a promo content item is linked to another content item (i.e. the associated attributes for that promo include a content identifier in the Target property), a dedicated promo function (a service element) will allow the viewer to select the targeted content item. The description for the promo function is defined by the service author.

The service management system (SMS) permits the detailed control of how individual content items are presented. The SMS determines from the attributes associated with the current content item: whether the video can be skipped over by the viewer, by separately switching on or off the flag for each individual promo; which segment of a video to display, by setting start and end timecodes in the SMS; whether DVD-like rewind, fast-forward and pause functionality can be activated and/or deactivated for a particular promo item; whether certain promo list items can be ignored when skipping back through the promo list; and whether a promo item has an item that the viewer can link to or not, by inputting that data.

When a promo is linked to another item, the service author can define a special function, which will allow the viewer to save the item to their favourites list. The SMS can be arranged to control whether this is possible by switching on or off the appropriate flag.

Various additions can be made to service wide authoring parameters. These are parameters that are in addition to the current service wide authoring parameters. These new parameters define where to navigate to when the viewer selects a promo, favourite or shortcut.

To illustrate the efficacy of the inventive system, consider the scenario where a service provider wishes to promote certain series and content available on his video service. On entering the service, an interactive promotion begins to play an content item promoting the first series of a popular comedy show. The viewer can link to the series from this promotion, by pressing a button on his remote controller (corresponding to a certain "button" displayed in the screen display).

The next promo content item in the sequence is a trailer for a movie for which VoD rights have recently been acquired. The viewer is informed that the movie is a pay-to-receive content item and that he can access this too by pressing an indicated RC button. In addition, a specific service listing available movies can be arranged to have the same promo content item (the movie trailer) attached to it. Therefore the viewer will be able to navigate between the two sequences without the video content items being interrupted.

Eventually, a content sequence will play to the end. The sequence may simply be looped to restart. Alternatively, the selection and/or ordering of content items may be altered. The action on finishing playback of a sequence might be to generate a content sequence with content order and selection randomised.

The invention claimed is:

1. A method for delivering video on demand (VoD) content items from a video server to at least a first remote device providing set top box-like functionality, the method comprising:
    storing a plurality of content items in a content store of said video server;
    storing a content sequence list, which determines the order in which the content items are to be delivered from the content store, said content sequence list being stored in a service database in said video server, said service database further including a user preference engine that, from said video server, tracks the behavior of said at least first remote device providing set top box-like functionality and automatically builds a profile based on that tracked behavior for one or more users of that at least first remote device, and said service database further including a service build file defining a plurality of navigation screens, each screen specifying a layout and associated functionality for displaying content items;

storing associated attributes for each and every content item in the content sequence list in an attribute store, wherein at least one of the associated attributes of each content item characterises which navigation actions are available for each content item; and serving to deliver, from the video server to the at least first remote device providing set top box-like functionality, the stored content items with their associated attributes according to the order defined by the content sequence list, said profile associated with said at least first remote device, and said service build file, the serving performed in response to a request received from the at least first remote device, wherein navigation within and between all of the served content items at the at least first remote device being enabled in accordance with the associated attributes of each of the content items, and the presentation of said content items being determined in accordance with the service build file.

2. A method as claimed in claim 1, wherein the content sequence list is a manually prepared list.

3. A method as claimed in claim 1, wherein the associated attribute is a "can skip" flag and the navigation action is a skip action, the action being available if the "can skip" flag indicates that the content item is skippable.

4. A method as claimed in claim 1, wherein at least one of the navigation attributes is a target property, and wherein the navigation action is a jump action, in which the playback point jumps from the current content item to a target in accordance with the target property.

5. A method as claimed in claim 4, wherein the target is a further content item and the target property is a content identifier corresponding to the further content item.

6. A method as claimed in claim 5, wherein the content item is a music video promotional content item, the further content item is a corresponding music video content item.

7. A method as claimed in claim 4, wherein the target is a further content sequence and the target property is a sequence identifier corresponding to the further content sequence.

8. A system for delivering video on demand (VoD) content items from a video server to at least a first remote device providing set top box-like functionality, the system comprising:

a content store, associated with the video server, for storing a plurality of content items;

a list store in a service database in said video server for storing a content sequence list, which determines the order in which content items are to be delivered from the content store, said service database further including a user preference engine that, from said video server, tracks the behavior of said at least first remote device and automatically builds a profile based on that tracked behavior for one or more users of that at least first remote device providing set top box-like functionality, and said service database further including a service build file defining a plurality of navigation screens, each screen specifying a layout and associated functionality for displaying content items;

an attribute store for storing associated attributes for each and every content item, wherein at least one of the associated attributes of each content item characterises which navigation actions are available for each content item; and a content server, for receiving requests from the at least first remote device and, in response to receiving the requests, for serving to deliver the content items from the video server to the at least first remote device with their associated attributes according to the order defined by the content sequence list, said profile associated with said at least first remote device, and said service build file, wherein navigation within and between all of the served content items at the at least first remote device being enabled in accordance with the associated attributes of each of the content items, and the presentation of said content items being determined in accordance with the service build file.

* * * * *